United States Patent
Yatsu et al.

(10) Patent No.: US 10,705,333 B2
(45) Date of Patent: Jul. 7, 2020

(54) PROJECTION OPTICAL SYSTEM AND HEAD-UP DISPLAY APPARATUS USING THE SAME

(71) Applicant: Maxell, Ltd., Kyoto (JP)

(72) Inventors: Masahiko Yatsu, Kyoto (JP); Akio Misawa, Kyoto (JP); Yuki Nagano, Kyoto (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 15/564,510

(22) PCT Filed: Apr. 6, 2015

(86) PCT No.: PCT/JP2015/060766
§ 371 (c)(1),
(2) Date: Oct. 5, 2017

(87) PCT Pub. No.: WO2016/162928
PCT Pub. Date: Oct. 13, 2016

(65) Prior Publication Data
US 2018/0081174 A1    Mar. 22, 2018

(51) Int. Cl.
*G02B 27/01* (2006.01)
*G02F 1/1335* (2006.01)
*G02B 17/08* (2006.01)

(52) U.S. Cl.
CPC ......... *G02B 27/0101* (2013.01); *G02B 17/08* (2013.01); *G02F 1/133526* (2013.01); *G02F 1/133553* (2013.01); *G02B 2027/0123* (2013.01)

(58) Field of Classification Search
CPC .............. G02B 27/0101; G02B 17/08; G02B 2027/0123; G02F 1/133553; G02F 1/133526
(Continued)

(56) References Cited

U.S. PATENT DOCUMENTS 6,366,400 B1*   4/2002   Ohzawa ............. G02B 27/0172
                                                           359/364
2005/0157398 A1    7/2005   Nagaoka et al.
(Continued)

FOREIGN PATENT DOCUMENTS

JP     2005-202145 A    7/2005
JP     2007-094394 A    4/2007
(Continued)

OTHER PUBLICATIONS

International Search Report of PCT/JP2015/060766 dated Jun. 9, 2015.

*Primary Examiner* — Charles S Chang
(74) *Attorney, Agent, or Firm* — Mattingly & Malur, PC

(57) ABSTRACT

A head-up display apparatus is provided which enables a wide viewing angle in spite of being a type that reflects image light on a windshield. Accordingly, a head-up display apparatus (110) includes an image formation unit (10) that displays image information, and a projection optical system that includes an eyepiece optical system 5 reflecting light emitted from the image formation unit (10) for display of a virtual image. The eyepiece optical system (5) includes a first optical element (51) having a negative refractive power, a second optical element (52) having a positive refractive power, and a concave reflecting mirror (54), and is configured to arrange the first optical element (51), the second optical element (52) and the reflecting mirror (53) in this order from the image formation unit.

8 Claims, 11 Drawing Sheets

(58) Field of Classification Search
USPC .......................................................... 349/13
See application file for complete search history.

(56) References Cited

U.S. PATENT DOCUMENTS

| | | | |
|---|---|---|---|
| 2007/0146358 A1* | 6/2007 | Ijzerman | H04N 13/363 345/419 |
| 2013/0021224 A1* | 1/2013 | Fujikawa | G02B 27/0101 345/7 |
| 2014/0218804 A1 | 8/2014 | Tanahashi | |
| 2014/0226215 A1* | 8/2014 | Komatsu | G02B 27/0172 359/631 |
| 2016/0291325 A1* | 10/2016 | Kasahara | G02B 27/0101 |

FOREIGN PATENT DOCUMENTS

| | | |
|---|---|---|
| JP | 2009-229552 A | 10/2009 |
| JP | 2011-209616 A | 10/2011 |
| JP | 2013-025205 A | 2/2013 |
| WO | 2013/024539 A1 | 2/2013 |

\* cited by examiner

FIG. 5

| DESIGNATION | SURFACE NUMBER | SHAPE | CURVATURE RADIUS | INTER-SURFACE DISTANCE | GLASS MATERIAL NAME | EFFECTIVE DIAMETER (RADIUS) | | | | DECENTER/TILT | | |
|---|---|---|---|---|---|---|---|---|---|---|---|---|
| | | | | | | RADIUS | X DIRECTION | Y DIRECTION | ΔY | DETAILS | DECENTER (mm) | TILT (DEGREE) |
| OBJECT SURFACE (VIRTUAL IMAGE SURFACE) | SURFACE 0 | PLANE | ∞ | 5000 | | | | | | | | |
| ENTRANCE PUPIL | SURFACE 1 | PLANE | ∞ | −1200 | | | 25 | 55 | | | | |
| MIRROR | SURFACE 2 | FREE-FORM SURFACE | 503.694 | 0 | REFLECTION | | 163.13 | 43.15 | 4.331 | DECENTER & RETURN | 0 | −19.27 |
| DUMMY SURFACE | SURFACE 3 | PLANE | ∞ | 210.000 | | | | | | REGULAR DECENTER | 0 | −37.03 |
| L1 | SURFACE 4 | FREE-FORM SURFACE | ∞ | 4 | "PMMA25" | | 56.26 | 12.20 | 26.20 | REGULAR DECENTER | 7.87 | 5.83 |
| | SURFACE 5 | FREE-FORM SURFACE | ∞ | 27.993 | | | 47.61 | 12.70 | 28.99 | DECENTER & RETURN | −1.01 | 0 |
| L2 | SURFACE 6 | SPHERE | 73.000 | 11.000 | FDS90 HOYA | 54.6 | 45.95 | 12.32 | 28.55 | REGULAR DECENTER | 0 | 38.73 |
| | SURFACE 7 | SPHERE | 98.090 | 6.997 | | 52.8 | 43.65 | 11.10 | 25.92 | | | |
| L3 | SURFACE 8 | SPHERE | 166.700 | 3.75 | LAC14 HOYA | 52.65 | 43.49 | 10.00 | 23.88 | | | |
| | SURFACE 9 | SPHERE | 51.362 | 21.328 | | 40.55 | 35.58 | 9.56 | 19.26 | | | |
| IMAGE SURFACE (INTERMEDIATE SURFACE) | SURFACE 10 | PLANE | ∞ | 0 | | | | | −0.01 | DECENTER & RETURN | 14.74 | −21.34 |

FIG. 6

| CODE | | MIRROR SURFACE (s2) | SURFACE L1A (SURFACE 4) | SURFACE L1B (SURFACE 5) |
|---|---|---|---|---|
| R | 1/c | 503.694 | 0 | 0 |
| K | K | | | |
| C3 | $Y^1$ | -8.80488E-02 | 7.87408E-01 | 7.28174E-01 |
| C4 | $X^2$ | -7.06173E-05 | 4.77796E-03 | 7.50152E-03 |
| C6 | $Y^2$ | -4.70317E-05 | -3.18396E-02 | -2.29180E-02 |
| C8 | $X^2Y$ | -5.90790E-07 | -3.61236E-05 | -2.52432E-05 |
| C10 | $Y^3$ | -4.32709E-07 | -5.27900E-04 | -1.97192E-04 |
| C11 | $X^4$ | -6.31520E-10 | -1.10844E-07 | 7.57725E-08 |
| C13 | $X^2Y^2$ | -1.44458E-09 | 3.67148E-06 | 1.78635E-06 |
| C15 | $Y^4$ | 1.56815E-09 | 1.82150E-05 | 2.02079E-05 |
| C17 | $X^4Y$ | 1.64401E-13 | 1.89649E-08 | 3.58204E-08 |
| C19 | $X^2Y^3$ | -6.95768E-12 | 1.36072E-07 | 7.28885E-09 |
| C21 | $Y^5$ | -4.28065E-12 | -2.00884E-07 | -5.36053E-07 |
| C22 | $X^6$ | 0 | -2.27696E-10 | -3.21587E-10 |
| C24 | $X^4Y^2$ | 0 | 1.88069E-09 | 7.32740E-10 |
| C26 | $X^2Y^4$ | 0 | 2.29954E-10 | 4.37636E-09 |
| C28 | $Y^6$ | 0 | 5.07726E-09 | 4.26520E-09 |
| C30 | $X^6Y$ | 0 | 3.32269E-12 | -7.05926E-12 |
| C32 | $X^4Y^3$ | 0 | -9.77490E-11 | -3.33090E-11 |
| C34 | $X^2Y^5$ | 0 | -2.35093E-10 | -1.20573E-10 |
| C36 | $Y^7$ | 0 | -2.46397E-11 | 7.20225E-11 |
| C37 | $X^8$ | 0 | 4.06460E-14 | 1.13598E-13 |
| C39 | $X^6Y^2$ | 0 | -3.79879E-14 | 2.36010E-13 |
| C41 | $X^4Y^4$ | 0 | 1.16749E-12 | 2.34511E-13 |
| C43 | $X^2Y^6$ | 0 | 3.96838E-12 | 8.63631E-13 |
| C45 | $Y^8$ | 0 | -1.97952E-12 | -1.49086E-12 |

PROJECTION OPTICAL SYSTEM AND HEAD-UP DISPLAY APPARATUS USING THE SAME

TECHNICAL FIELD

The present invention relates to a projection optical system and a head-up display apparatus using the same and, more particularly, to a projection optical system arranged to project an image on a windshield in an vehicle, aircraft and the like so that the projected image can be observed as a virtual image through the windshield, and a head-up display apparatus using the projection optical system.

BACKGROUND ART

As a technique relating to head-up display apparatus, Patent Literature 1 discloses the arrangement "that includes a translucent liquid crystal display panel, a backlight for backlighting the liquid crystal display panel, and a projection optical system for enlarging and projecting an image displayed on the liquid crystal display panel. The projection optical system includes relay lenses and a projection lens. The relay lenses are arranged to utilize telecentric display light with high efficiency if several conditions are met, so that the image displayed on the liquid crystal display panel is enlarged to form a real image. The real image is further enlarged and projected on the windshield of the automobile by the projection lens, displaying a virtual image for the driver (excerpts from the abstract)."

Further, Patent Literature 2 discloses the arrangement "that includes an image formation element that forms an image to be displayed and an optical element that causes a virtual image to be displayed by reflecting light emitted from the image formation element. The optical element has a shape concave toward the direction of travel of the light emitted from the image formation element. The optical element also directly receives the light emitted from the image formation element without being reflected by another optical element. Further, the image formation element is arranged approximately at right angles to the direction in which the virtual image is perceived through the optical element (excerpts from the abstract)."

CITATION LIST

Patent Literature

Patent Literature 1: Japanese Unexamined Patent Application Publication No. 2009-229552
Patent Literature 2: International Publication No. WO2013/024539

SUMMARY OF INVENTION

Technical Problem

In an example of the windshield-type head-up displays as disclosed in Patent Literature 1, a display panel has dimensions of 30 mm by 10 mm and a magnification of 5.02 times, so that the dimensions of a virtual image are 150.6 mm by 50.2 mm. Accordingly, from a calculation using a virtual image distance of 2000 mm, a horizontal viewing angle results in 4.3 degrees (=2a tan (150.6/2/2000)), and a vertical viewing angle results in 1.4 degrees (=2a tan (50.2/2/2000)). That is, in the invention of Patent Literature 1, image information must be displayed within the bounds defined by 4.3 by 1.4 degree viewing angle. Image quality corresponding to resolution of the virtual image displayed by the head-up display is subject to constraints of the resolving power of human eye. Because of this, the need for wider viewing angle for placement of much more pixels arises for the purpose of improving the image quality.

Meanwhile, in a combiner-type head-up display apparatus disclosed in Patent Literature 2, an intermediate image by a laser light source has dimensions of 75 mm by 25 mm, a virtual image distance is 1500 mm and a virtual image size (size of a reference screen) is 450 mm by 150 mm. Therefore, a horizontal viewing angle is 17.1 degrees (=2a tan (450/2/1500)) and a vertical viewing angle is 5.7 degrees (=2a tan (150/2/1500)), which are greater than those in the windshield-type head-up display disclosed in Patent Literature 1.

However, a large intermediate image of 75 mm by 25 mm is required to ensure the viewing angle of 17.1 degrees horizontal and 5.7 degrees vertical, causing an unavoidable increase in size of the head-up display apparatus. To address this, in the invention of Patent Literature 2, the combiner is placed in a position above sight and also at a 500 mm distance from the observer (driver) in order to prevent an increase in size of the head-up display apparatus. As a result, the combiner is located very near the observer (driver). Because of this, even when the head-up display apparatus is not used, the combiner exists within sight of the observer (driver), which causes feeling of cramped space in the in-car space.

Further, in comparison with the windshield type, the combiner type requires a longer amount of time to recognize image information because of a larger difference between (a direction of) a line of sight when the area ahead is looked and (a direction of) a line of sight when the virtual image of the head-up display apparatus is seen.

Therefore, there is the fact that a need exists for a wider viewing angle in the head-up display apparatus using the windshield type.

The present invention has been made in view of the above, and an object of the present invention is to provide a projection optical system that enables a wide field of view in spite of being the type that image light is reflected on the windshield, and a head-up display apparatus using the projection optical system.

Solution to Problem

For a solution to the above problems, a projection optical system includes an eyepiece optical system that causes a virtual image to be displayed by reflecting light emitted from an image formation unit forming image information. The eyepiece optical system includes a first optical element having a negative refractive power, a second optical element having a positive refractive power, and a concave reflecting mirror, and is configured to arrange the first optical element, the second optical element and the reflecting mirror in this order from the image formation unit.

Further, the present invention provides a head-up display apparatus including an image formation unit and the projection optical system.

Advantageous Effects of Invention

According to the present invention, a head-up display apparatus can be provided that enables a wide field of view in spite of being the type that reflects image light on the windshield. It should be noted that the above and other problems, arrangements and advantageous effects will be apparent from the following description of embodiments.

BRIEF DESCRIPTION OF THE DRAWINGS

FIG. 1 shows overall ray diagrams of an eyepiece optical system 5 of a first embodiment, in which FIG. 1(a) presents the state of image information on a virtual image plane 7 being seen in the Y-Z plane with eyes of an observer, and FIG. 1(b) presents the state of image information on the virtual image plane 7 being seen in the X-Z plane with the eyes of the observer.

FIG. 5 is a table illustrating lens data of the head-up display apparatus according to the first embodiment.

FIG. 6 is a table of free-form surface coefficients of the head-up display apparatus according to the first embodiment.

DESCRIPTION OF EMBODIMENT

An embodiment and various examples according to the present invention will now be described with reference to the drawings and the like. The following description is only illustrative of a specific example of the subject matter of the present invention, and is not meant to be restrictive of the present invention, and therefore, those skilled in the art may make a variety of alterations and modifications that fall within the scope of technical concept disclosed herein. In all the drawings used to describe the present invention, the same reference signs are used to refer to elements with the same functions, and a repetitive description may be omitted.

Figure 9:
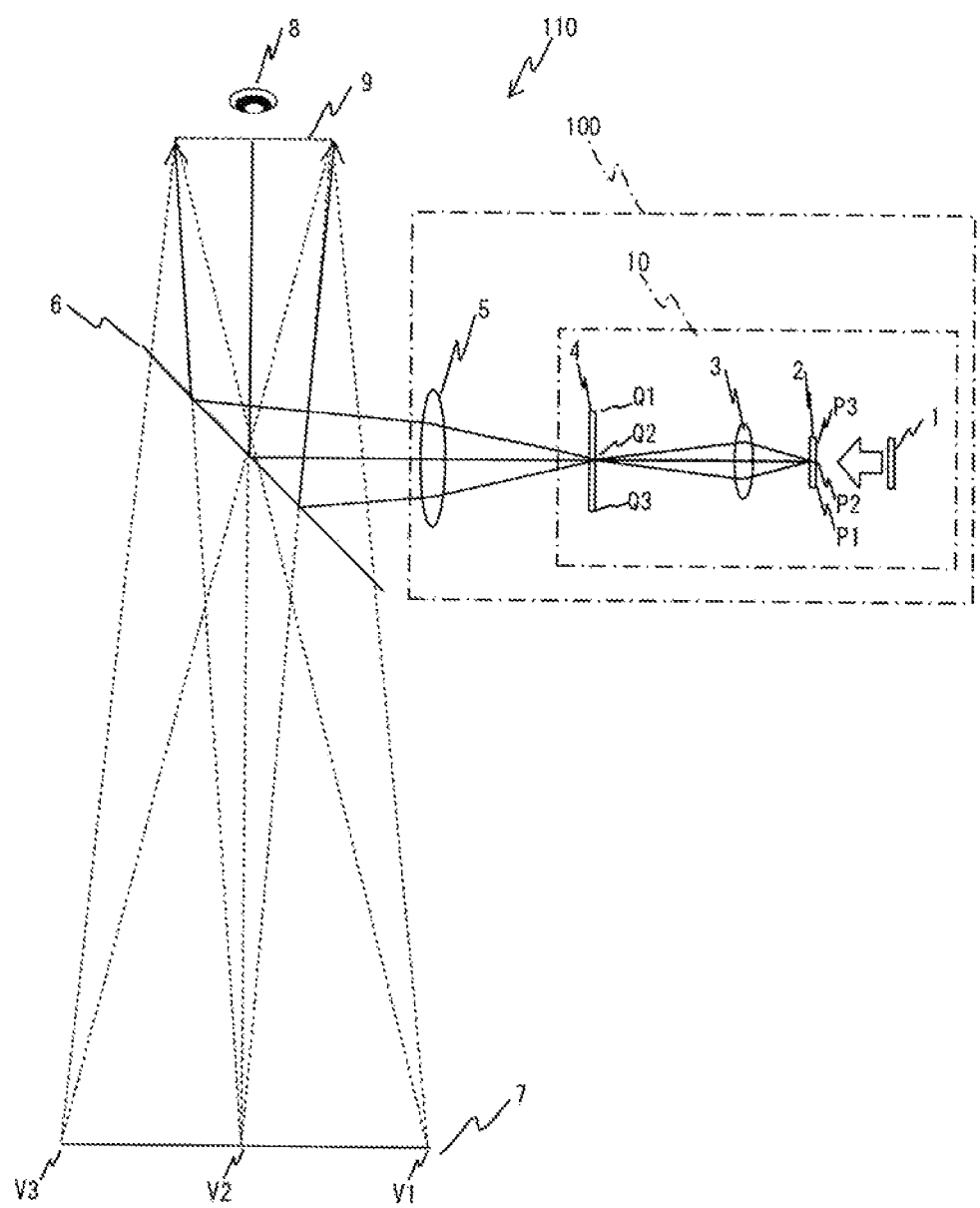
FIG. 9 is a schematic configuration diagram of the head-up display apparatus.

A basic configuration of a head-up display apparatus is described using FIG. 9. FIG. 9 is a schematic configuration diagram of the head-up display apparatus.

The head-up display apparatus 110 illustrated in FIG. 9 includes a configuration in which image light is emitted from a projection optical system 100 including an image formation unit 10 and an eyepiece optical system 5, and then is reflected on a windshield 6 of a vehicle (not shown) to enter eyes 8 of an observer.

More specifically, luminous flux is emitted from a backlight 1 to a liquid crystal display panel 2, and then enters a relay optical system 3 as image luminous flux including image information displayed on the liquid crystal display panel 2. By the imaging function in the relay optical system 3, the image information on the liquid crystal display panel 2 is enlarged and projected onto a screen panel 4 in an enlarged view. Points P1, P2, P3 on the liquid crystal display panel 2 correspond to points Q1, Q2, Q3 on the screen panel 4, respectively. The use of the relay optical system 3 enables employing a liquid crystal display panel with a small display size. The backlight 1, liquid crystal display panel 2, relay optical system 3 and screen panel 4 form image information (image information) on the screen panel 4, which are thus collectively referred to as the image formation unit 10.

Then, the image information on the screen panel 4 is projected onto the windshield 6 by the eyepiece optical system 5, and then the luminous flux reflected by the windshield 6 reaches the position of the eyes 8 of the observer. A relationship is established in which, when viewed from the observer's eyes, the observer looks just like the image information on the virtual image plane 7. The points Q1, Q2, Q3 on the screen panel 4 correspond to points V1, V2, V3 on the virtual image plane 7, respectively. Noted that a range, in which the points V1, V2, v3 on the virtual image plane 7 can be seen even if the position of the eyes 8 is moved, is an eye-box 9. Thus, as a viewfinder eyepiece lens of a camera and an eyepiece lens in a microscope, the eyepiece optical system is an optical system to display an image (virtual image) of an object (spatial image) in front of the observer's eyes.

Further, the screen panel 4 includes a microlens array with a two-dimensional arrangement of microlenses. This causes the diffusion effect, as a result of which the spread angle of the luminous flux exiting the screen panel 4 is increased so that the size of the eye-box 9 reaches predetermined dimensions. Note that the diffusion effect in the screen panel 4 may also be provided by diffusion particles being embedded therein.

Here, issues that arise in the prior art are organized with reference to FIG. 10 before the main points of the present invention are described with reference to FIG. 11.

Figure 10:
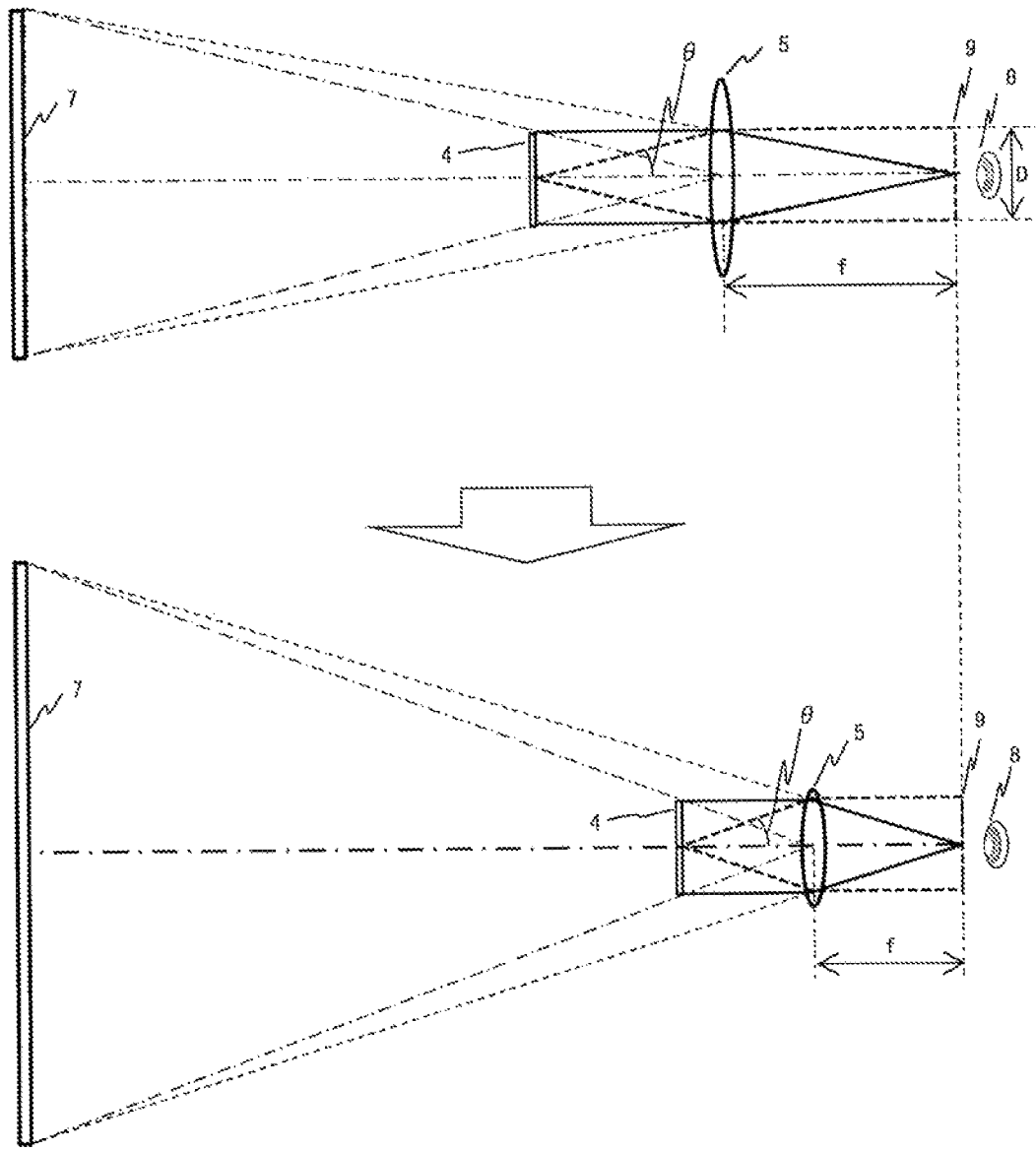
FIG. 10 is a diagram illustrating the problem of wider angle (widening of a viewing angle) in which the viewing angle of a virtual image is widened.

FIG. 10 is a diagram illustrating the problem of wider angle (widening of a viewing angle) in which the viewing angle of a virtual image is increased. In FIG. 10, the image information on the screen panel 4 is imaged onto the virtual image plane 7 by the eyepiece optical system 5, so that the observer is able to observe the virtual image plane 7 when the eyes 8 are located within the range of the eye-box 9. In this connection, if the viewing angle of the virtual image plane 7 is narrow, the amount of image information to be displayed on the virtual image plane becomes small (see the upper diagram of FIG. 10). Therefore, in the lower diagram of FIG. 10, the refractive power of the eyepiece optical system 5 is increased (the focal length f is reduced) to widen the viewing angle.

Here, in the lower diagram of FIG. 10, the luminous flux diameter D is set equal to that in the upper diagram of FIG. 10 in order to ensure the eye-box 9 of the same size as that in the upper diagram of FIG. 10. Because of this, it is seen that the F value of the eyepiece optical system 5 is smaller than F=f/D, that is, there is need for a larger aperture. At the same time, because the focal length f of the eyepiece optical system 5 is shorter, the distance from the eyepiece optical system 5 to the position of the observer's eyes 8 (eye relief) is also shorter.

The conventional windshield-type head-up display apparatus provides a long eye relief in which the windshield 6 is located thereon (omitted in FIG. 10), but has a tendency to have a viewing angle with a small value. Therefore, a widening of viewing angle is desired in order to project much more image information. Meanwhile, the conventional combiner-type head-up display apparatus facilitates ensuring a relatively wide viewing angle, but the eye relief has such a small value that the windshield cannot be located on the eye relief, causing the need for placement of a dedicated combiner to arise. Therefore, there is a problem that the combiner makes the in-vehicle space cramped.

Then, improving the eye relief in the windshield-type head-up display apparatus is a feature of the head-up display apparatus according to the present embodiment. The configuration contributing to the improved eye relief is described with reference to FIG. 11. FIG. 11 is a diagram illustrating an extension of the eye relief according to the present embodiment.

Figure 11:
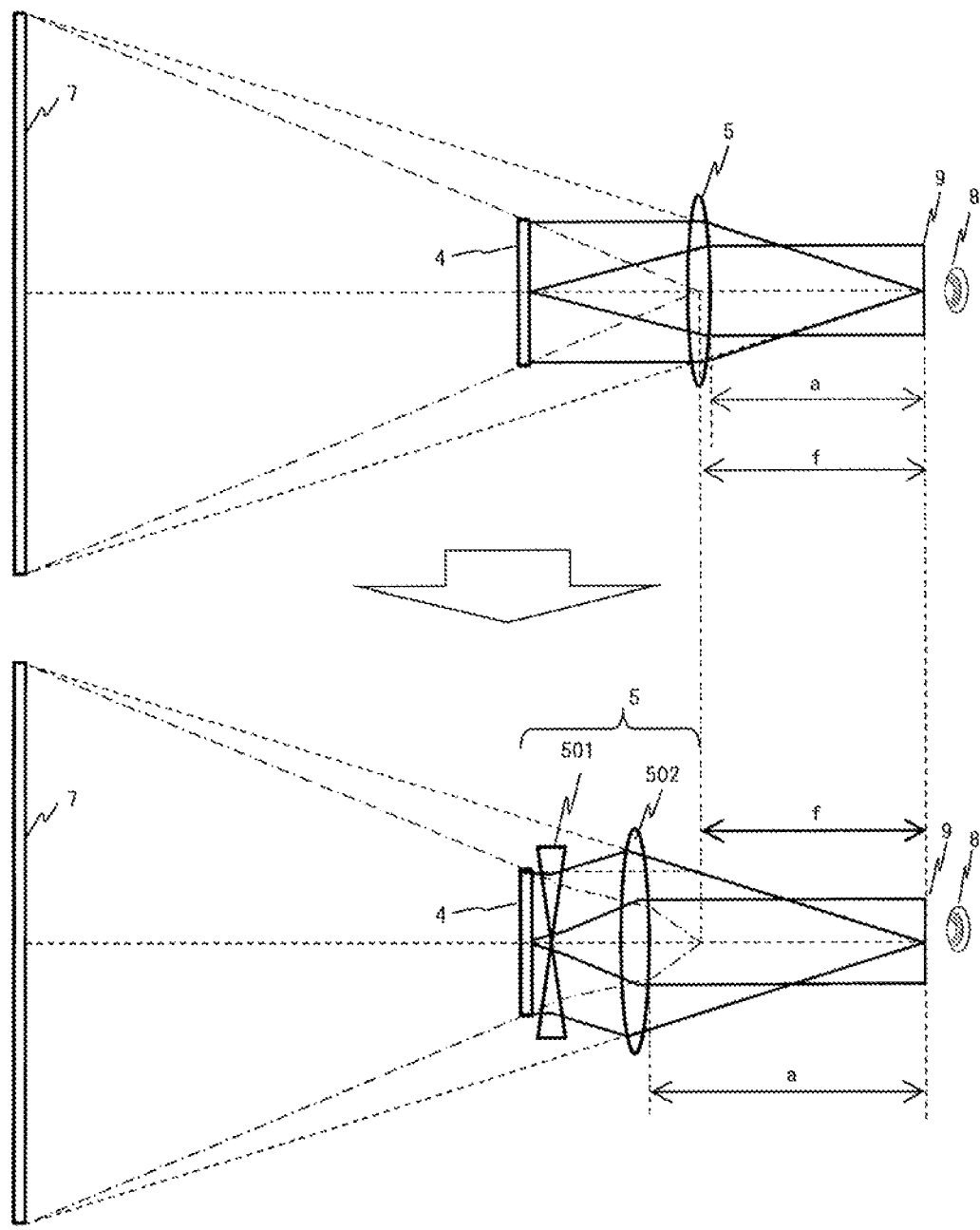
FIG. 11 is a diagram for illustrating an extension of eye relief according to the present embodiment.

In the lower diagram of FIG. 11, an optical element 501 with a negative refractive power and an optical element 502 with a positive refractive power are arranged in order from the screen panel 4. Because of this, as compared with a conventional example in the art illustrated in the upper diagram of FIG. 11, the same focal length f is ensured, while a larger value is ensured for the length of an eye relief a.

It is noted that a so-called field lens can be placed immediately behind the screen panel 4 in order to redirect light rays around the axis, but the focal length f of the eyepiece optical system 5 as described above shows little change because the field lens has a low ray height of the light rays on the axis. Conversely, the field lens may be arranged while the advantageous effects of the present invention are maintained.

First Embodiment

Figure 1:
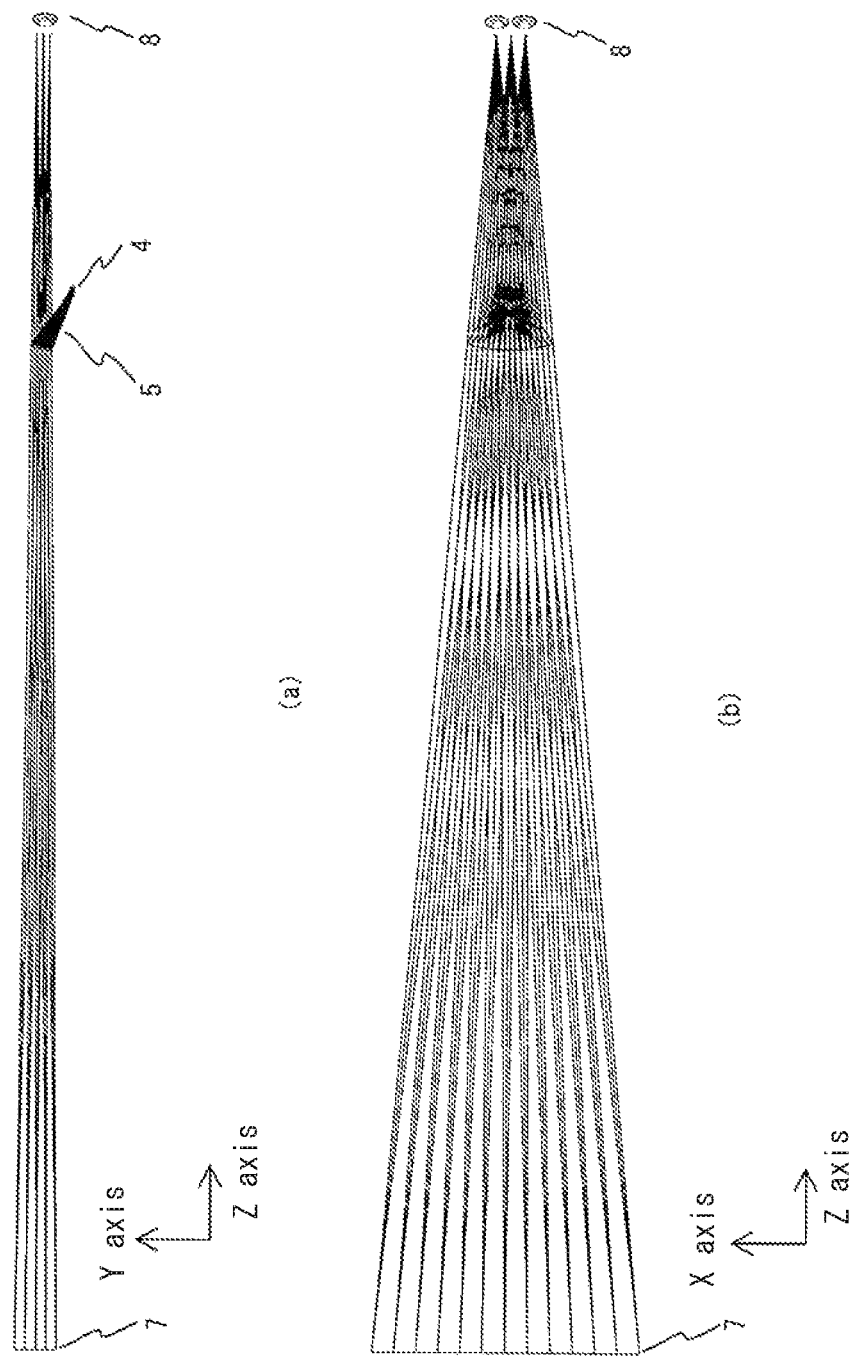

In a first embodiment, a feature is a configuration of, in particular, the eyepiece optical system 5 of the head-up display apparatus 110 shown in FIG. 9. Accordingly, the configuration of eyepiece optical system is described with reference to FIG. 1. FIG. 1 shows overall ray diagrams of the eyepiece optical system 5 according to the first embodiment, in which FIG. 1(a) presents the state in which image information on the virtual image plane 7 is seen in the Y-Z plane with the eyes of the observer, and FIG. 1(b) presents the state in which image information on the virtual image plane 7 is seen in the X-Z plane with the eyes of the observer. The right eye and the left eye overlap in the Y-Z plane (see reference sign 8), but the right eye and the left eye are separately shown in the X-Z plane.

Figure 2:
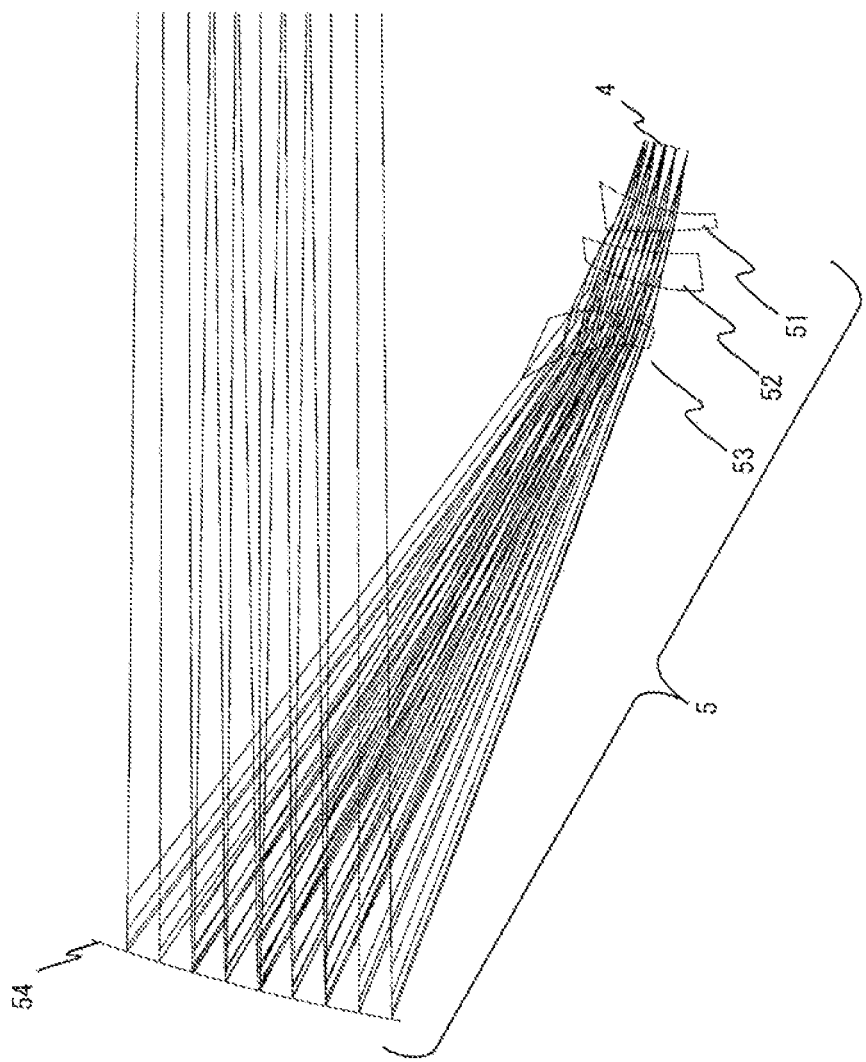
FIG. 2 is an enlarged diagram of a principal part of the eyepiece optical system of the first embodiment.

FIG. 2 is an enlarged diagram of a principal part of the eyepiece optical system according to the first embodiment. As illustrated in FIG. 2, the eyepiece optical system 5 includes a concave lens 51 with a negative refractive power, a convex lens 52 with a positive refractive power, a rotationally asymmetrical free-form surface lens 53 and a rotationally asymmetrical free-form surface mirror 54 which are arranged in order from the screen panel 4. The rotationally asymmetrical free-form surface lens 53 has a trapezoidal distortion correction function.

Figure 3:
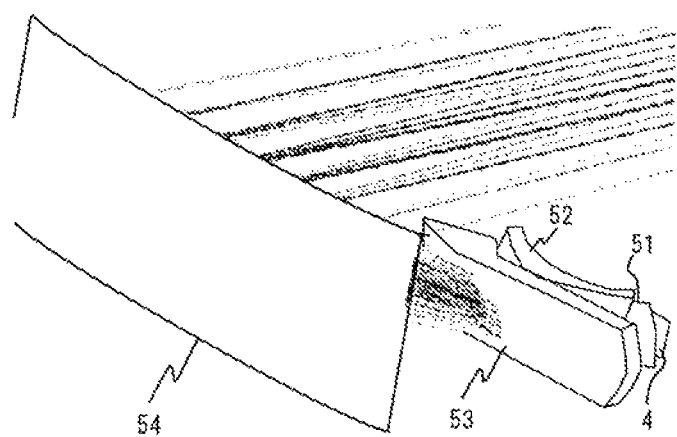
FIG. 3 is a perspective, enlarged diagram of a principal part of an optical system of a head-up display apparatus according to the first embodiment.
Figure 4:
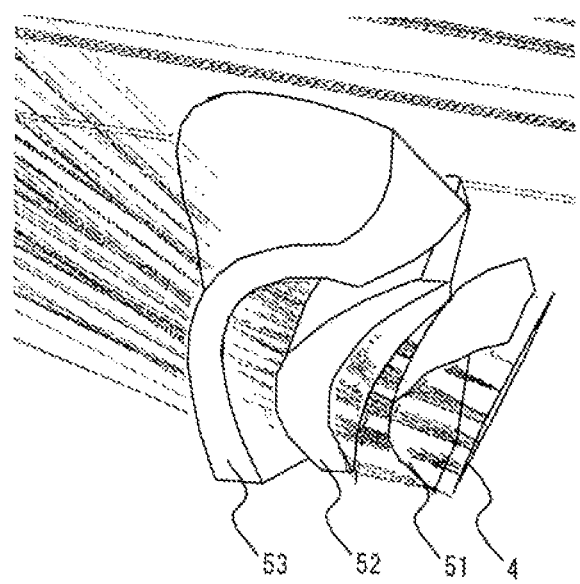
FIG. 4 is a perspective, enlarged diagram of a lens portion of the head-up display apparatus according to the first embodiment.

FIG. 3 is a perspective, enlarged diagram of a principal part of an optical system of the head-up display apparatus according to the first embodiment. FIG. 4 is a perspective, enlarged view of a lens portion of the head-up display apparatus according to the first embodiment. As illustrated in FIG. 3 and FIG. 4, the free-form surface lens 53 and the free-form surface mirror 54 are each formed in a rotationally asymmetrical shape. It is noted that the concave lens 51 and the convex lens 52 have a high amount of decentering (no-decentering on the front and rear faces).

FIG. 5 is a table illustrating lens data of the head-up display apparatus according to the first embodiment. In the lens data shown in FIG. 5, a curvature radius is expressed with a positive sign if the center position of the curvature radius is located in the traveling direction, and an inter-surface distance shows a distance on the optical axis from a vertex position of each surface to a vertex position of the subsequent surface.

Decenter is shown by a value in the Y axis direction, and tilt is shown as a rotation around the X axis in the Y-Z plane, and the decenter and tilt act on the corresponding surface in the order of decenter and then tilt. In "regular decenter", the subsequent surface is placed in a position in the inter-surface distance on a new coordinate system in which decenter and tilt act. Decenter and tilt in a decenter and return act on only the surface and have no effect on the subsequent surface.

PMMA in a glass material name is acrylic plastic (Polymethyl methacrylate).

FIG. 6 is a table of free-form surface coefficients of the head-up display apparatus according to the first embodiment. The free-form surface coefficients in FIG. 6 can be determined by the following equation (1).

[Equation 1]

$$Z = \frac{c \cdot (x^2 + y^2)}{1 + \sqrt{1 - (1+k)c^2 \cdot (x^2 + y^2)}} + \sum \sum (C_j(m, n) \times x^m \times y^n) \quad (1)$$

wherein $$j = [(m+n)^2 + m + 3n]/2 + 1$$

Free-form surface coefficient $C_j$ is a rotationally asymmetrical shape relative to each optical axis (Z axis), which is a shape defined by a component of a cone term and a component of a term in a polynomial in X and Y. For example, where X is second (m=2) and Y is third (n=3), a coefficient $C_{19}$, in which j={$(2+3)^2+2+3\times 3$}/2+1=19, corresponds thereto. Further, a position of an optical axis in each free-form surface is defined by the amount of decenter-tilt in the lens data shown in FIG. 5.

Figure 7:
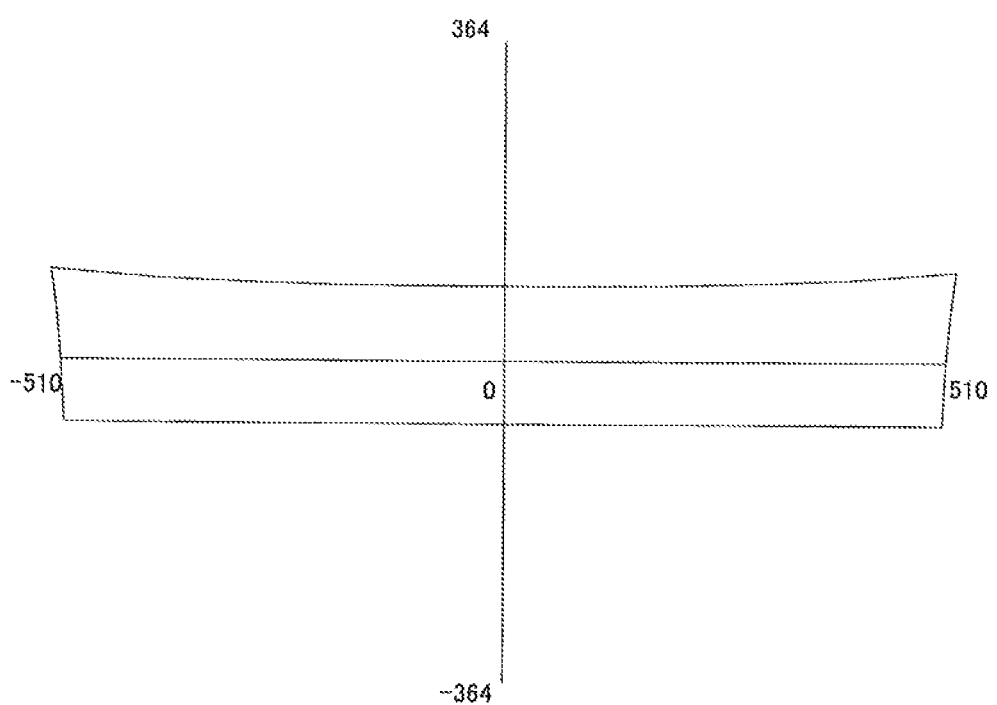
FIG. 7 is a diagram presenting the distortion performance of the head-up display apparatus in the first embodiment.
Figure 8:
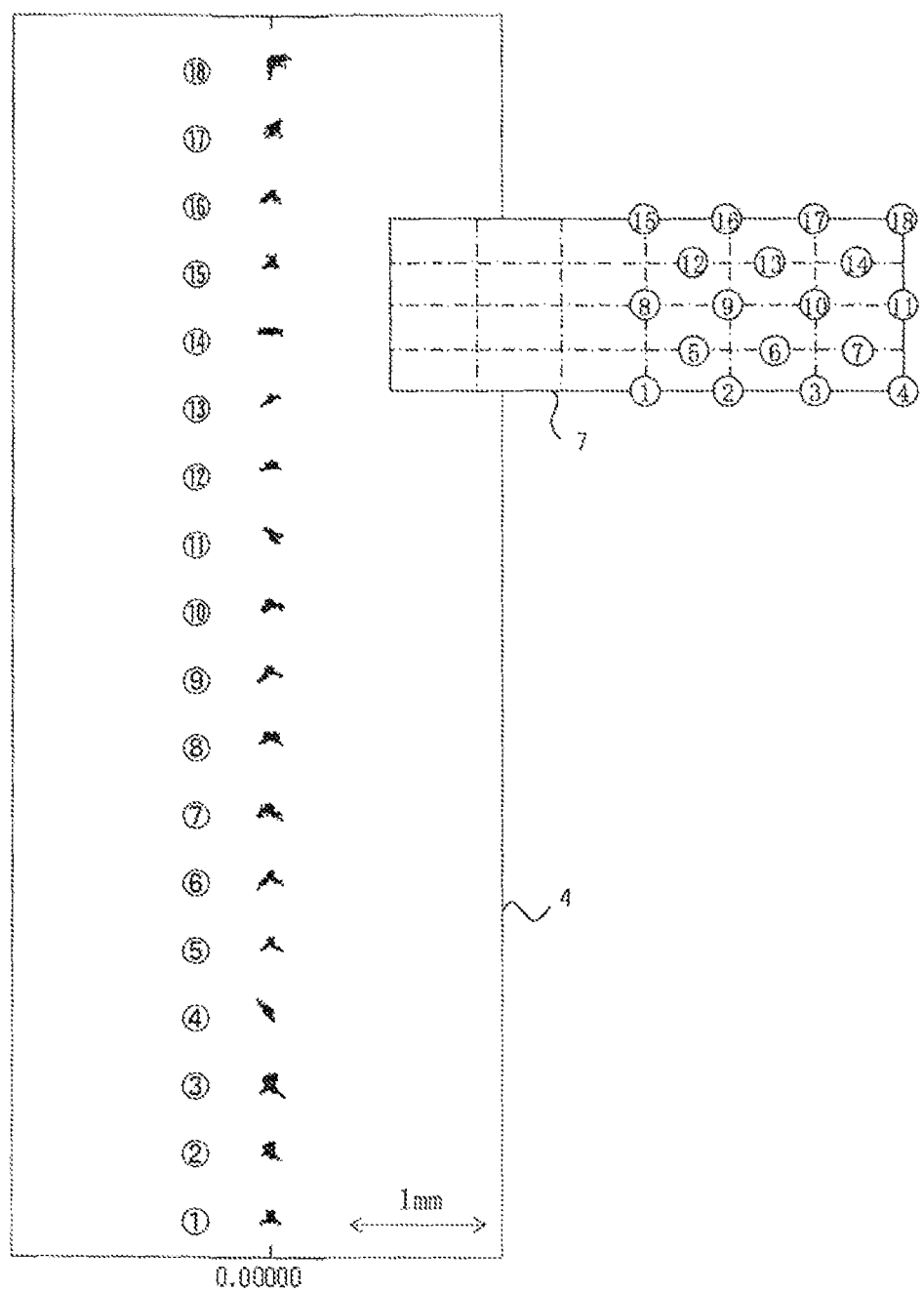
FIG. 8 is a spot diagram of the head-up display apparatus in the first embodiment.

The optical performance in the first embodiment will now be described using FIG. 7 and FIG. 8. FIG. 7 is a diagram presenting the distortion performance of the head-up display apparatus in the first embodiment. FIG. 8 is a spot diagram of the head-up display apparatus in the first embodiment.

FIG. 7 shows how a rectangular frame on the screen panel 4 distorts on the virtual image plane 7. Further, the dimensions of the virtual image in FIG. 7 has 1020 mm horizontal and 155.6 mm vertical on the lines of a cross including the optical axis. Because of this, when a calculation is made using a 5000 mm distance from the eyes 8 to the virtual image plane 7, a widening of viewing angle to 11.6 degrees horizontal (=a tan (1020/2/5000)) and 1.8 degrees vertical (=a tan (155.6/2/2000)) is implemented.

FIG. 8 illustrates a spot diagram obtained by placing object points on the virtual image plane 7 and calculating them on the screen panel 4, in which favorable optical performance is implemented. It is noted that the spot diagram is a spot diagram when the eye-box 9 has a size corresponding to the total luminous flux with 110 mm horizontal×50 mm vertical, and, in the case of an actual observer (driver) looking a virtual image, a spot diagram obtained using a size of the iris of a human's eye (which is considered to be φ7 mm at the maximum) is significantly better than that in FIG. 8.

According to the present embodiment, the head-up display apparatus can be provided which enables a wide viewing angle while a longer eye relief is ensured although the head-up display apparatus is of the type which uses the concave lens to widen temporarily the angle of luminous flux from the screen panel 4 and then causes the luminous flux to enter the convex lens in order to reflect the image light on the windshield.

Second Embodiment

A second embodiment has a feature that the configuration of the image formation unit 10 is different from that in the first embodiment. Specifically, in the first embodiment, the image information on the liquid crystal display panel 2 is mapped to the screen panel 4 having the diffusion function. Instead of the configuration of this image formation unit 10, a method may by employed in which the laser light source is optically scanned in order to form an optical scan image on the screen panel 4 having the diffusion function. The solid angle of the luminous flux is widened by the diffusion function in the screen panel 4, and the resulting luminous flux enters a first optical element, thus providing a head-up display providing a wide viewing angle. The image formation unit according to the second embodiment may be configured using Micro Electro Mechanical Systems.

LIST OF REFERENCE SIGNS

1 Backlight
2 Liquid crystal display panel
3 Relay optical system
4 Screen panel (Diffuser)
5 Eyepiece optical system
6 Windshield
7 Virtual image plane
8 Observer's eye(s)
9 Eye-box
10 Image formation unit
51 Concave lens (First optical element)
52 Convex lens (Second optical element)
53 Free-form surface lens
54 Free-form surface mirror (Reflecting mirror)

The invention claimed is:

1. A projection optical system, comprising:
   an image formation unit configured to emit light as image information from a screen panel; and
   an eyepiece optical system configured to display a virtual image by reflecting the light emitted from the screen panel of the image formation unit,
   wherein the image formation unit includes a liquid crystal display panel, a relay optical system, and the screen panel, the relay optical system configured to guide light from the liquid crystal display panel to the screen panel,
   wherein the eyepiece optical system includes a first optical element having a negative refractive power and which transmits the light emitted from the screen panel, a second optical element having a positive refractive power, a surface lens, and a concave reflecting mirror,
   the eyepiece optical system is configured with the first optical element, the second optical element, the surface lens, and the reflecting mirror disposed in this order from the screen panel of the image formation unit, and
   wherein the eyepiece optical system is disposed on an emission side of the screen panel with respect to a path of the light emitted from the screen panel.

2. The projection optical system according to claim 1,
   wherein the surface lens is a rotationally asymmetrical lens, and
   the reflecting mirror is a rotationally asymmetrical mirror.

3. The projection optical system according to claim 1,
   wherein the surface lens is a rotationally asymmetrical free-form lens,
   the first optical element is a spherical lens having a negative refractive power,
   the second optical element is a spherical lens having a positive refractive power, and
   the reflecting mirror is a rotationally asymmetrical free-form surface mirror.

4. The projection optical system according to claim 1,
   wherein the second optical element is configured to transmit the light from the first optical element to the surface lens and the surface lens is configured to transmit the light to the reflecting mirror.

5. A head-up display apparatus, comprising:
   an image formation unit including a liquid crystal display panel configured to emit light as image information, a relay optical system configured to guide the light from the liquid crystal display panel, and a screen panel disposed to receive the light from the relay optical system and form an intermediate image; and
   an eyepiece optical system configured to display a virtual image by reflecting light, corresponding to the intermediate image, which is emitted from the screen panel of the image formation unit,
   wherein the eyepiece optical system includes a first optical element having a negative refractive power and which transmits the light emitted from the screen panel, a second optical element having a positive refractive power, a surface lens, and a concave reflecting mirror,
   the eyepiece optical system is configured with the first optical element, the second optical element, the surface lens, and the reflecting mirror disposed in this order from the screen panel of the image formation unit, and
   wherein the eyepiece optical system is disposed behind the screen panel with respect to a path of the light emitted from the relay optical system.

6. The head-up display apparatus according to claim 5,
   wherein the screen panel has a diffusion function.

7. The head-up display apparatus according to claim 5,
   wherein the surface lens is a rotationally asymmetrical lens, and
   the reflecting mirror is a rotationally asymmetrical mirror.

8. The head-up display apparatus according to claim 5,
   wherein the surface lens is a rotationally asymmetrical free-form lens,
   the first optical element is a spherical lens having a negative refractive power,
   the second optical element is a spherical lens having a positive refractive power, and
   the reflecting mirror is a rotationally asymmetrical free-form surface mirror.

* * * * *